United States Patent [19]

Paul

[11] 4,015,560
[45] Apr. 5, 1977

[54] APPLICATION OF GASKET-FORMING MATERIAL TO WORKPIECES

[76] Inventor: William A. Paul, 1808 Parkside Blvd., Toledo, Ohio 43607

[22] Filed: Jan. 12, 1976

[21] Appl. No.: 648,394

[52] U.S. Cl. .............................. 118/323; 141/250; 222/255

[51] Int. Cl.² .......................................... B05C 5/02

[58] Field of Search .......... 118/323, 305, 321, 631, 118/14, 24; 239/66; 222/255, 330; 141/250

[56] References Cited

UNITED STATES PATENTS 3,110,425  11/1963  Fuller ................................ 222/255

Primary Examiner—Louis K. Rimrodt
Attorney, Agent, or Firm—Allen D. Gutchess, Jr.

[57] ABSTRACT

Apparatus is provided for applying gasket-forming material to workpieces. The apparatus includes a supply of the gasket-forming material under pressure with a nozzle communicating with the material for directing the material to mateable surfaces of workpieces which are to be joined to mateable surfaces of other workpieces. Means are provided to move the nozzle over the mateable surfaces and to supply beads of the gasket-forming material thereto. The means include a track positioned in a predetermined location relative to the mateable surface, with means connected to the nozzle and the material supply and movable along the track to move the nozzle in the desired direction. When the connecting means makes one trip around the track, a complete bead of the gasket-forming material is applied to the mateable surface of the associated workpiece from the nozzle. Another workpiece is then moved into position and the bead-applying process is repeated. The nozzle can be moved in the same direction around the mateable surface each time, or the direction can be reversed for the mateable surface of the next workpiece.

14 Claims, 5 Drawing Figures

APPLICATION OF GASKET-FORMING MATERIAL TO WORKPIECES

This invention relates to apparatus for applying gasket-forming material to workpieces.

More and more commonly, gaskets for effecting seals between mateable surfaces of workpieces are being replaced by gasket-forming material. This material has a number of advantages over gaskets. A sizable gasket inventory is eliminated and there is no need to cut or otherwise form special gaskets for particular workpieces. Further, gaskets can shrink or wear to produce loosening and leakage between the assembled workpieces, and gaskets sometimes require re-torquing, as well as produce disassembly and removal problems. The gasket-forming material, on the other hand, frequently provides an improved seal and effectively seals scratched or otherwise damaged surfaces, and also improves the structural integrity of the assembled workpieces.

Heretofore, the gasket-forming material commonly has been applied from tubes and a bead of the material was manually deposited from the tube onto the surface of the workpiece which is to be mated with a surface of another workpiece. Templates have also been manually manipulated to a limited extent to apply the material when a number of workpieces are to have the gasket-forming material. While the templates have been satisfactory for a few workpieces, they have not been adequate for producing gasket-type seals on workpieces on a production basis. Further, because of the above-outlined advantages of the gasket-forming material, the desirablity of applying this material quickly and accurately in production has accordingly increased.

The present invention provides apparatus for applying beads of the gasket-forming material to mateable surfaces of workpieces in a rapid, accurate, and efficient manner. In accordance with the invention, a supply of the gasket-forming material is placed under pressure and communicates with a nozzle through which the material is directed toward the mateable surfaces of workpieces. The apparatus also includes a track which is of the same general shape as the bead of the gasket-forming material which is to be applied to the mateable surfaces. A track follower is also provided which is suitable supports the nozzle, and means are included to move the track follower around the track and correspondingly move the nozzle over the desired path of the beads on the mateable surfaces of the workpieces. When one bead has been applied, that workpiece is removed and another workpiece is positioned under the track and the process is repeated. In one embodiment, the nozzle can be moved in a common direction around the mateable surface for each workpiece. In another embodiment, the nozzle can be moved in the opposite direction over the next workpiece.

It is, therefore, a principal object of the invention to provide means for applying beads of gasket-forming material to mateable surfaces of workpieces in a more rapid and efficient manner.

Many other objects and advantages of the invention will be apparent from the detailed description of preferred embodiments thereof, reference being made to the accompanying drawings, in which:

FIG. 4 is a plan view on a much smaller scale of a workpiece to which a bead of gasket-forming material has been applied.

Figure 1:
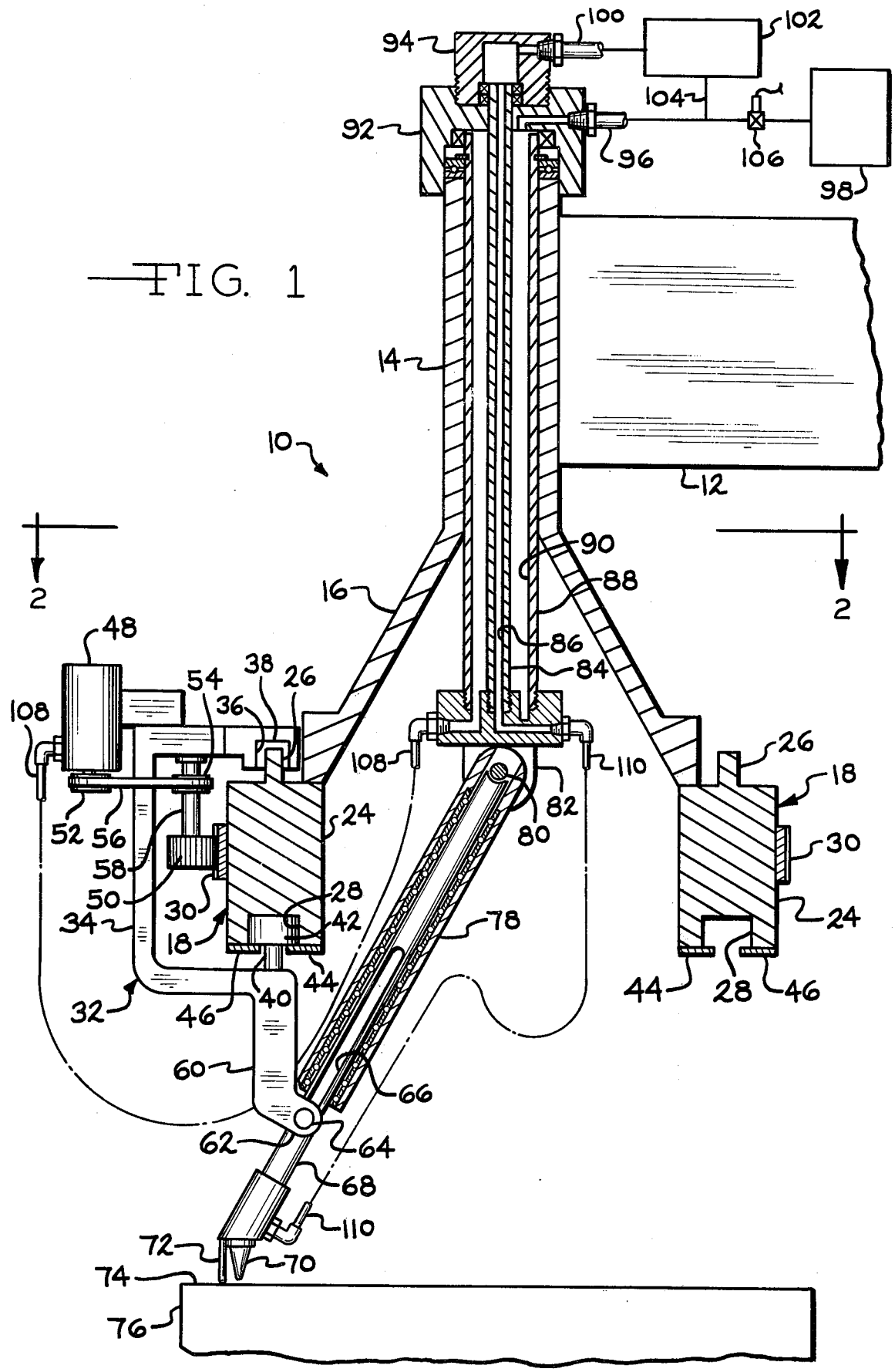
FIG. 1 is a somewhat schematic view in vertical cross section taken centrally through apparatus embodying the invention.
Figure 3:
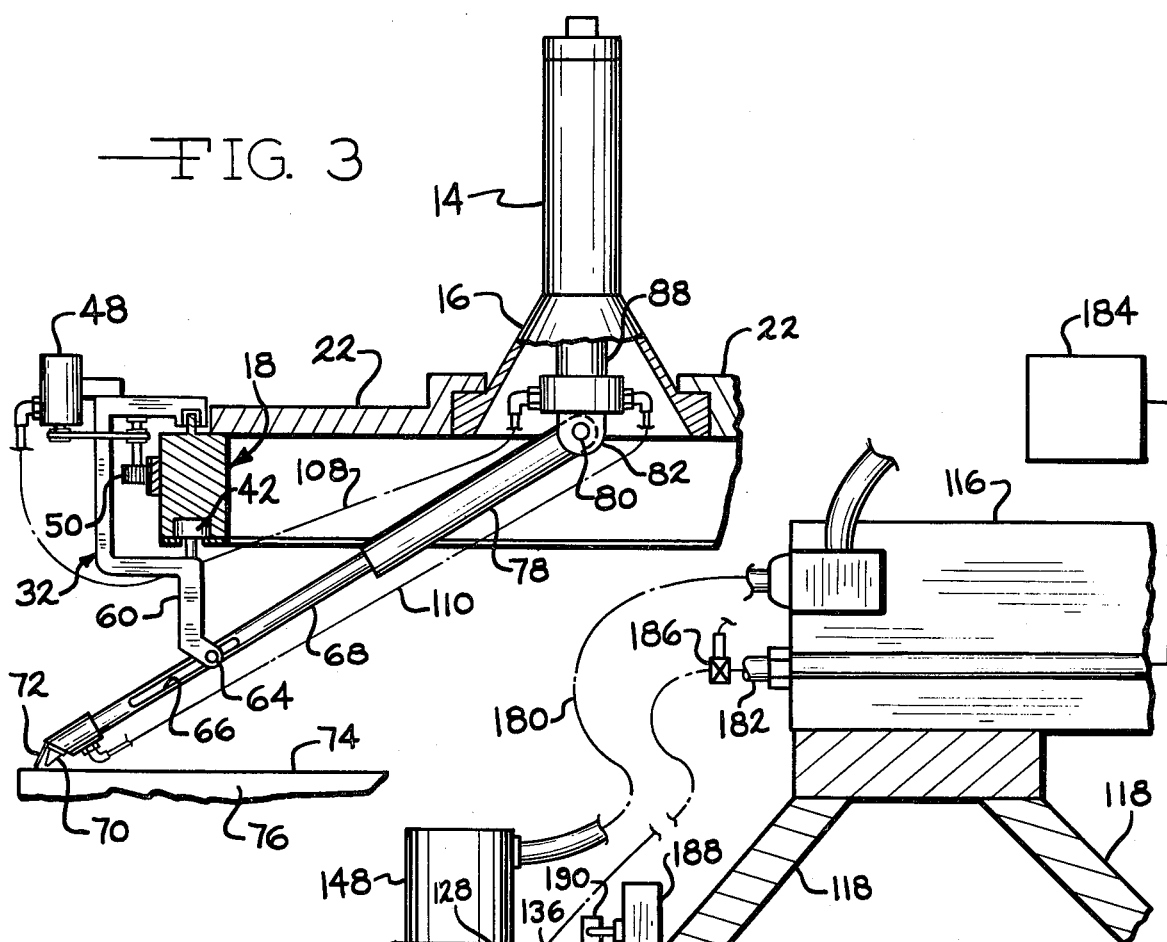
FIG. 3 is a somewhat schematic fragmentary view siimilar to FIG. 1 but showing certain components of the apparatus in different positions.

Referring to the drawings, apparatus for applying a bead of gasket-forming material in accordance with the invention is indicated at 10. The apparatus includes a main supporting frame 12 suitably affixed to a vertical sleeve 14 from which a conical housing 16 flares downwardly and outwardly. A track indicated at 18 is of a shape generally similar to the shape of the bead of gasket-forming material which is to be applied to a mateable surface of a workpiece. The track 18 is mounted at the periphery of the conical housing 16 by fasteners 20 and straps 22 or other suitable means. The housing 16 can be adapted to receive, position, and support a variety of the tracks 18, depending upon the particular needs for the particular workpiece involved. The track 18, as shown in FIGS. 1 and 3, includes a main body 24 having an upper rail 26 and a lower groove 28. The outer surface of the body 24 also has a rack 30 extending therearound and of a shape similar to that of the rail 26 and the groove 28.

A track follower or support 32 comprises a C-shaped frame or bracket 34 having a notch 36 in the upper end with a plastic insert 38 held therein and received on the rail 26 in sliding engagement therewith. The lower end of the C-shaped frame 34 has an upwardly extending axle 40 on which is rotatably mounted a roller 42. The roller 42 is received in the groove 28 and held therein by inner and outer plates 44 and 46.

An air-operated motor 48 is mounted on an upper end portion of the C-shaped frame 34 and drives a pinion 50 through sheaves 52 and 54 and a belt 56. The sheave 54 is mounted on a shaft 58 along with the pinion 50 with the shaft 58 being rotatably mounted on and depending from the upper end portion of the C-shaped frame 34. When the motor 48 is operated to drive the pinion 50, which is engaged with the rack 30, the support 32 is moved around with the track 18.

A control arm or member 60 depends from the frame 34 and has a yoke 62 at the lower end through which a pin 64 extends. The pin 64 also extends through a slot 66 in a nozzle-supporting rod or member 68 which carries a gasket-forming material nozzle 70 at its lower end. A supporting foot 72 is located at one side of the nozzle to position the nozzle 70 slightly above a mateable surface 74 of a workpiece 76 (see also FIG. 4). The rod 68 is slidably carried in a follower sleeve 78 which is pivotally connected at its upper end by a pin 80 to a manifold member 82.

A central tube 84 extends upwardly from the member 82 and forms a central passage 86. Similarly, an outer tube 88 extends upwardly from the member and forms an annular passage 90. Above the main frame 12, the upper ends of the tubes 84 and 88 are rotatably connected by suitable seals to lower and upper supply caps 92 and 94. Air under pressure is supplied to the annular passage 90 through a line 96 from a suitable source 98 and gasket-forming material is supplied to the central passage 86 through a line 100 from a suitable source 102. The gasket-forming material at the source 102 can be maintained under pressure by air supplied from the air source 98 through a line 104. A control valve 106 can regulate the air supplied to both of the lines 96 and 104. The valve preferably also vents the air pressure on the gasket-forming material at the source 102 when the valve is closed to eliminate any superfluous flow of the material from the nozzle 70. At the lower ends of the tubes, the air is supplied to the air motor 48 through a flexible line 108 and the gasket-forming material is supplied to the nozzle 70 through a flexible line 110.

In the operation of the apparatus 10, the workpiece 76 is first moved into a predetermined position under the apparatus by a suitable conveyor and positioned by suitable arms or the like which can be swung into and out of the path of the workpieces. When the workpiece is in position, the valve 106 can be opened to supply air pressure to the gasket-forming material source 102 to supply the gasket-forming material to the nozzle 70. At the same time, the air can be supplied to the motor 48 to drive the pinion 50 and move the support 32 and the nozzle 70 around the track 24 with the nozzle 70 moving along the mateable surface 74 of the workpiece 76 to deposit a bead 112 (FIG. 4) of the gasket-forming material thereon.

As the nozzle 70 moves towards the ends of the workpiece, the rod 68 moves outwardly from the sleeve 78, as shown in FIG. 3, and then moves back in toward the sides of the workpiece which are closer to the axis of the tubes 84 and 88. When the nozzle has made one complete pass around the mateable surface 74, the valve 106 can be closed manually or automatically to stop the supply of the gasket-forming material to the nozzle 70 and to stop the motor 48. The workpiece 76 can then be moved on and another one moved into position in its place with the cycle then repeated.

Figure 2:
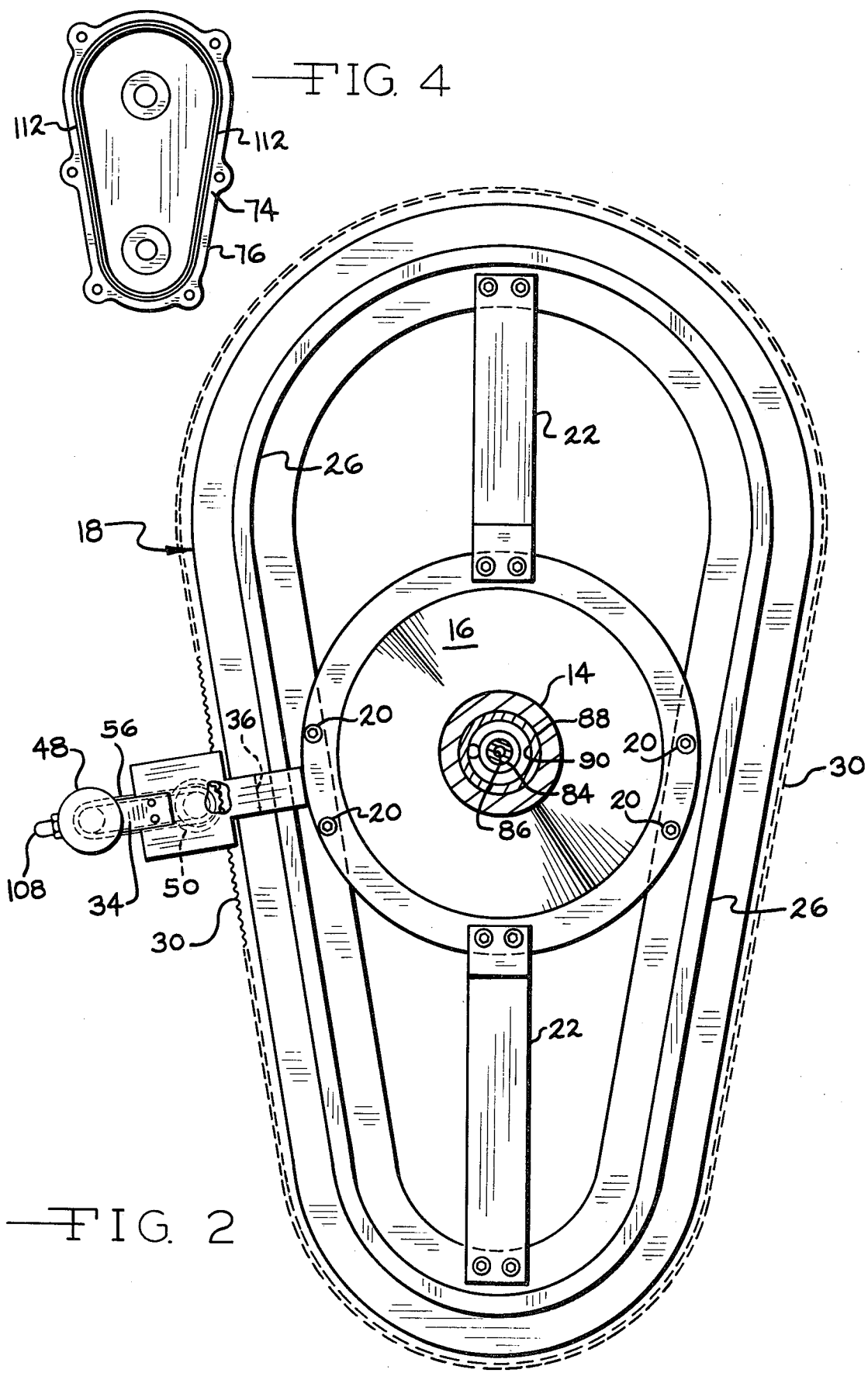
FIG. 2 is a somewhat schematic view in horizontal cross section taken along the line 2—2 of FIG. 1.

It will be readily understood that with the apparatus of FIGS. 1–3, the track can be considerably smaller than the mateable surface of the workpiece since the nozzle-supporting rod and associated components can be proportioned to extend substantially beyond the track, as shown in FIG. 3.

Figure 5:
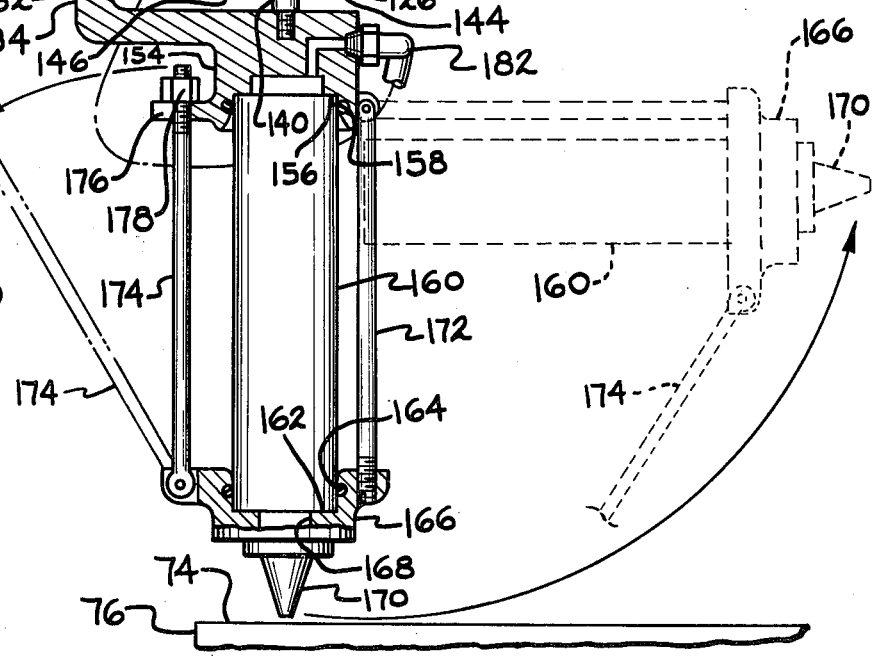
FIG. 5 is a fragmentary view in vertical cross section of somewhat modified apparatus according to the invention.

Modified apparatus for applying beads to mateable surfaces of workpieces in a rapid and efficient manner is indicated at 114 in FIG. 5. This apparatus differs from that of FIGS. 1–3 in several respects. With the apparatus 114, the bead is laid on one workpiece surface in one direction and on the next workpiece surface in the opposite direction. Consequently, the central tubes 84 and 88 with their associated bearing components and manifold can be eliminated and the apparatus simplified thereby. In addition, instead of the remote source 102 of the gasket-forming material, a cartridge of the material can be employed adjacent the nozzle.

The apparatus 114 includes a main supporting frame 116 from which a conical housing 118 depends. A track indicated at 120 again is of a shape generally similar to the shape of the bead of the gasket-forming material which is to be applied to the mateable surface 74 of the workpiece 76. The track and head are also of substantially the same size in this instance. The track 120 can be mounted on the housing 118 similarly to the arrangement for the track 18 and a variety of the tracks can be used with the housing, according to the particular workpieces involved. The track 120 includes a main body 122 with an upper rail 124 and a lower groove 126. An outer surface 128 of the body 122 also has a rack 130 extending therearound and of a shape and size similar to the bead to be applied to the workpiece and to the rail 124 and the groove 126.

A track follower or support 132 comprises a C-shapeed frame or bracket 134 having a notch 136 in the upper end with a plastic insert 138 received on the rail 124 in sliding engagement therewith. The lower end of the frame 134 has an upwardly-extending axle 140 on which is rotatably mounted a roller 142. The roller is received in the groove 126 and held therein by inner and outer retaining plates 144 and 146.

The rails 26 and 124 and the grooves 28 and 126 need not be of identical shape. For example, where it might be desired to cause the bead to follow an arc around a bolt hole, by way of example, the associated portion of the groove can be appropriately shaped to cause the lower end of the frame 34 or 134 to move the nozzle 70 or 170 accordingly, with the rail being straight at this portion.

In this instance, an electrically-operated motor 148 is mounted on an upper end portion of the frame 134 and drives a pinion 150 mounted directly on a drive shaft 152. When the motor 148 is operated to drive the pinion 150, the support 132 is moved around the track 120 similarly to the apparatus of FIGS. 1–3.

A cartridge-receiving member 153 depends from the frame 134 and has a recess 156 with an O-ring gasket 158 which receives the upper end of a gasket-forming material cartridge 160. The lower end of the cartridge 160 is received in a recess 162 having an O-ring gasket 164 in a lower supporting member 166. The member 166 has a passage 168 communicating with a nozzle 170 and is supported below the control member 154 by a hinged link 172 pivotally connected at its upper end to the member 154 and by a fastening rod or link 174 pivoted at its lower end to the member 166 and received in a slotted flange 176 of the upper member 154. The fastening link 174 has a nut 178 at its upper end which can be tightened when the link is in its vertical position to securely hold the cartridge 160 in its operating position in sealing engagement with the upper and lower members 154 and 166.

To replace the cartridge 160, the nut 178 is loosened and the link 174 is swung out to the dotted line position. The cartridge 160, along with the member 166 and the link 172, can be swung to the generally horizontal position indicated in dotted lines with the cartridges 160 then removed from the recess 162 and a new cartridge substituted therefor. The assembly is then moved back to the vertical position with the link 174 moved to its vertical position and the nut 178 tightened. The cartridges 160 are commercially-available to provide a ready source of supply.

The power for the motor 148 is supplied by a flexible electric line 180 and air is supplied under pressure to the upper end of the cartridge 60 through a flexible line 182 from a source 184, the line 182 having a control valve 186 therein.

In the operation of the apparatus 114, the workpiece is moved into position as before with the motor 148 then operated in one direction to move the support 132 and the nozzle 170 over the workpiece in one direction. When the nozzle completes one pass, a switch 188 mounted on the housing 118 can be actuated by a trip projection 190 extending upwardly from the frame 134. This can shut off the power to the motor 148 and close the valve 186 to relieve the air pressure on the cartridge 160. When the next workpiece is moved into position, the motor 148 can then be operated in the opposite direction to move the support 132 and the nozzle 170 in the opposite direction over the next workpiece and back to the original position where the switch 188 is then actuated by the projection 190 in the opposite direction. The initial actuation of each cycle of the apparatus can be manually controlled or, by way of example, the switch 188 can operate a timer which starts the motor in the opposite direction and turns on the air again after a predetermined period of time long enough to assure that the next workpiece is in position.

Rather than relieving the air pressure on the material in the cartridge 160, an electrically operated valve can be located in the passage 168 of the member 166, with this valve being closed when a cycle is complete to stop flow of the gasket-forming material. In such an instance, pressure on the gasket-forming material in the cartridge can be maintained by a spring-loaded plunger, by way of example, in place of air pressure since constant pressure can be maintained on the material.

Various modifications of the above-described embodiments of the invention will be apparent to those skilled in the art, and it is to be understood that such modifications can be made without departing from the scope of the invention, if they are within the spirit and the tenor of the accompanying claims.

I claim:

1. Apparatus for applying a bead of gasket-forming material along a mateable surface of a workpiece, said apparatus comprising a track located in a predetermined position relative to the mateable surface of the workpiece, said track having a shape generally the same as the shape desired for the bead to be applied to the mateable surface of the workpiece, a gasket-forming material nozzle carried by said track and directed toward the mateable surface of the workpiece, means for supplying gasket-forming material to said nozzle, and means for moving said nozzle along the track and along a determined path relative to the workpiece.

2. Apparatus according to claim 1 characterized by said means for supplying gasket-forming material comprises a cartridge of the gasket-forming material connected with said nozzle and located between said nozzle and said track.

3. Apparatus according to claim 1 characterized by said track being substantially the same size as the desired bead.

4. Apparatus according to claim 1 characterized by said track being smaller in size than the desired bead.

5. Apparatus according to claim 1 characterized by said moving means moves said nozzle in the same direction over each sequential workpiece surface.

6. Apparatus according to claim 1 characterized by said moving means moves said nozzle in the opposite direction over each sequential workpiece surface.

7. Apparatus according to claim 1 characterized by said moving means comprises a rack positioned in a shape corresponding to the predetermined path, a pinion meshing with said rack, and means carried by said track for rotating said pinion.

8. Apparatus for applying a bead of gasket material of predetermined shape on a mateable surface of a workpiece, said apparatus comprising track means having a shape similar to that desired for the bead, a gasket-forming material nozzle, means for supplying gasket-forming material to said nozzle, supporting means for supporting said gasket-forming material nozzle from said track means in a position directed toward the mateable surface of the workpiece, and means including drive means for moving said nozzle and said supporting means over the mateable surface of the workpiece in a path having the same shape as the shape desired for the bead.

9. Apparatus according to claim 8 characterized by said track means being substantially the same size as the desired bead.

10. Apparatus according to claim 8 characterized by said track means being smaller in size than the desired bead.

11. Apparatus according to claim 8 characterized by said means for supplying the gasket-forming material comprises a cartridge of the material located between said nozzle and said moving means.

12. Apparatus according to claim 8 characterized by said moving means moves said nozzle in the same direction over each sequential workpiece surface.

13. Apparatus according to claim 8 characterized by said moving means moves said nozzle in the opposite direction over each sequential workpiece surface.

14. Apparatus according to claim 8 characterized by said moving means comprises a rack positioned in a shape similar to the path of the nozzle, a pinion meshing with said rack, and said drive means being connected to and rotating said pinion.

* * * * *